Aug. 19, 1924.

F. J. PAICE 1,505,665

AUTOMATIC GAMBREL

Filed July 20, 1921

Inventor
Frank J. Paice
By William J. Jacobi
Attorney

Patented Aug. 19, 1924.

1,505,665

UNITED STATES PATENT OFFICE.

FRANK J. PAICE, OF SMITHFIELD, OHIO.

AUTOMATIC GAMBREL.

Application filed July 20, 1921. Serial No. 486,055.

*To all whom it may concern:*

Be it known that I, FRANK J. PAICE, a citizen of the United States, residing at Smithfield, in the county of Jefferson and State of Ohio, have invented certain new and useful Improvements in Automatic Gambrels, of which the following is a specification.

This invention relates to new and useful improvements in meat handling devices and more particularly to an automatic gambrel, the primary object of the invention being to provide a device which will permit the carcass of an animal to be hung thereon, the weight of the animal spreading the arms of the gambrel so that the hind quarters of said animal are opened, thus assisting the operator in his work.

A further object of the invention resides in providing a device of this character consisting of few and simple parts, one which is inexpensive to manufacture and very efficient and useful in operation.

With these and other objects in view my invention consists in the novel features of construction, combination and arrangement of parts as will be hereinafter referred to and more particularly pointed out in the specification and claim.

In the accompanying drawing forming a part of this application—

Figure 2:
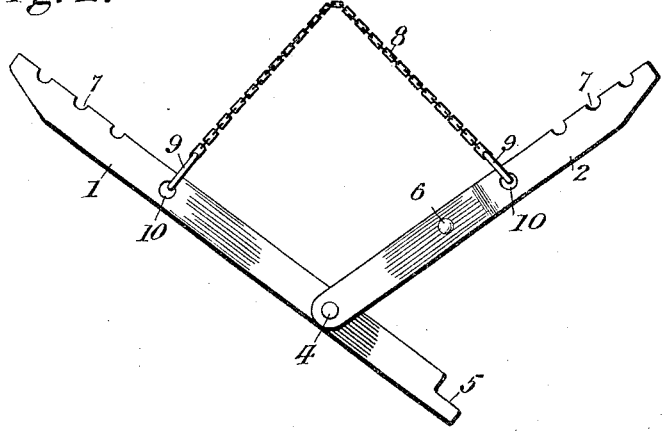
Fig. 2 is a similar view with the arms in contracted position.
Figure 3:
Fig. 3 is a plan view of the device as shown in Fig. 1, leaving off the suspension chain.

In describing the invention I shall refer to the drawing in which similar reference characters designate corresponding parts throughout the several views, and in which 1 and 2 designate respectively the arms of my improved device, the arm 1 being constructed preferably of a single strip of metal and the arm 2 being constructed of two elements secured together and spread apart from the center to the inner end thereof to provide a fork-like portion 3. The arm 1 is of greater length than the arm 2 and said arm 1 is pivoted as shown at 4 between the ends of the fork-like portion 3 of the arm 2, the said pivot point being disposed a short distance from the inner end of the arm 1, as clearly disclosed in Fig. 2 of the drawing. The inner end of the arm 1 from the pivot point to the extreme end thereof is adapted to be disposed between the bifurcations of the inner end of the arm 2, and in order to limit the movement of the arms with respect to one another, the inner end of said arm 1 is offset or cut away as shown at 5, and a stop pin 6 is mounted between the bifurcations of the inner end 3 of the arm 2.

Figure 1:
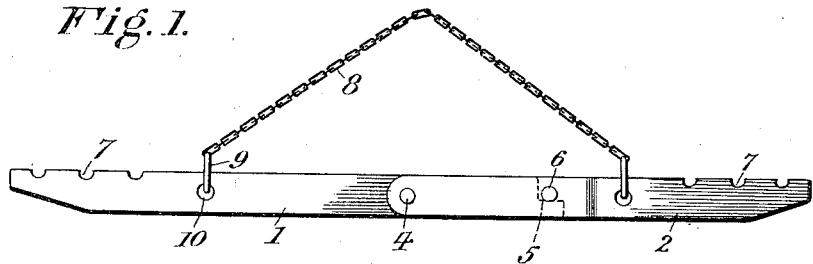
Figure 1 is a side elevation of my improved device with the arms thereof in outspread position.

It will thus be seen from this construction that the arms 1 and 2 are limited in their outward movement with respect to one another so that when disposed to their outermost positions in longitudinal alignment, as shown in Fig. 1, the offset 5 of the arm 1 engages the pin 6 of the arm 2.

The upper edges of the arms 1 and 2 adjacent their ends are notched or grooved, as shown at 7, to engage more readily the meat of the animal being operated upon, and a suspension chain 8 is provided which has at its ends the hook members 9, the latter being engaged with openings 10 formed in the arms 1 and 2 about midway between the ends thereof and the pivot 4.

It will be seen from this construction that when the device is properly suspended from a support above and the animal to be slaughtered is placed thereon so that parts thereof are engaged with the ends of the arms 1 and 2, the weight of the animal will cause the arms 1 and 2 to be outspread, as seen in Fig. 1, thus separating the hind quarters and permitting the operator to readily carry out his work.

From the foregoing description of the construction of my improved device, the operation thereof will be readily understood, and it will be seen that I have provided a simple, inexpensive and efficient means for carrying out the objects of the invention.

While I have particularly described the elements best adapted to perform the functions set forth, it is obvious that various changes in the form, proportion and in the minor details of construction may be resorted to without departing from the spirit or sacrificing any of the advantages of the invention.

Having thus described my invention, what I claim is:

A device of the class described comprising a pair of arms of unequal lengths, the shorter of said arms being formed of a single strip of metal looped and bent upon itself intermediate its ends, the bent portions being clamped together for approximately half the distance thereof, the remaining length of the arm having the strands spaced apart to provide a bifurcated inner end, the longer arm being pivoted adjacent its inner end between the ends of the furcations of the first mentioned arm to provide an inner extension portion for reception between said furcations, the extreme free end of said extension being offset to provide a shoulder, a stop pin extending laterally through the bifurcated portion of said first mentioned arm adapted to receive said shoulder in contact therewith to limit the movement of said arms with respect to one another in one direction, the inner opposed edges of said arms adjacent their outer ends being provided with engaging notches, and a flexible connection having its ends loosely engaged with said arms intermediate the ends thereof.

In testimony whereof I affix my signature.

FRANK J. PAICE.